May 30, 1961        J. L. KING        2,986,519
PROCESS FOR FORMING A GRAPHITE LUBRICANT
Filed May 6, 1957
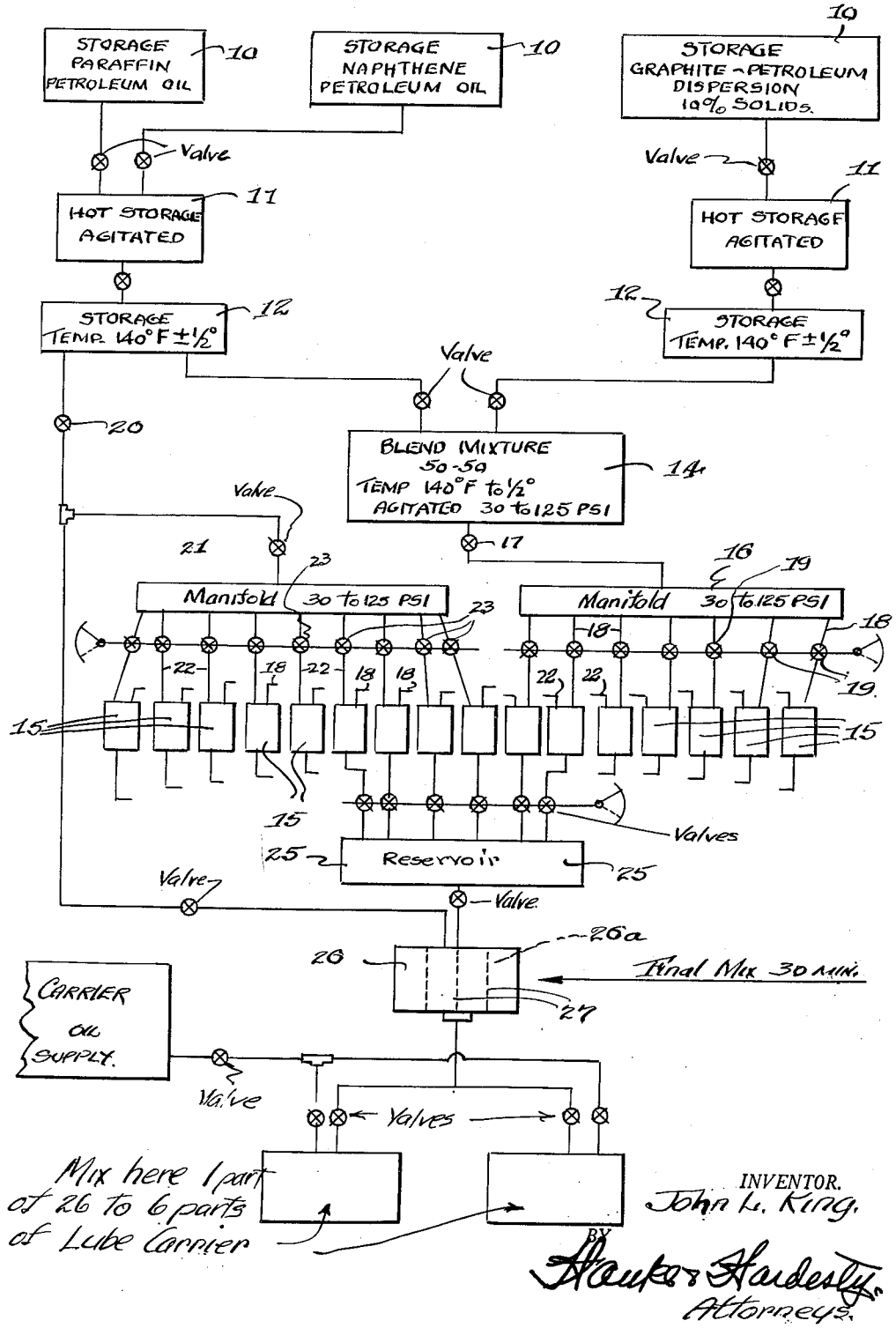

United States Patent Office 2,986,519
Patented May 30, 1961

2,986,519
PROCESS FOR FORMING A GRAPHITE LUBRICANT

John L. King, Royal Oak, Mich., assignor, by direct and mesne assignments, of thirty percent to Arthur J. Wiesner, thirty percent to Lyndon Wilson, and forty percent to Sherwin B. Harris Filed May 6, 1957, Ser. No. 657,157

5 Claims. (Cl. 252—30)

My invention relates to a lubricant and to a process of manufacturing a petroleum graphite composition of synthetic colloidal graphite in suspension with a petroleum oil material. More particularly the basic composition is adapted to be mixed with a selected petroleum oil depending on the application and use for which said lubricant is to be put.

Many graphite and oil compositions claim to have a product in which the graphite is held in suspension in the carrier. However, tests on such compositions have shown that all such products do not have complete graphite suspension since the graphite can be separated out of the composition with a centrifugal force as low as about 200 G's. Graphite dispersions having graphite particles of from 1½ to 5 micron size are readily available but experience has shown that graphite of such size cannot be ordinarily mixed with oil and suspended therein. Complete suspension can only be obtained by going through certain essential time and temperature controls, in agitating the mixture as hereinafter described in detail, and diagrammatically illustrated in the accompanying drawing.

The raw materials used in the manufacture of my new product include a synthetic colloidal graphite dispersion such as "Dag" manufactured and sold by the Acheson Colloid Corporation of Port Huron, Michigan, or "Grafo" manufactured by Grafo Colloid Company, of Sharon, Pennsylvania. Both of these products contain 10% solids by weight of synthetic colloidal graphite of a particle size of from 1½ to 5 microns, dispersed in 90% by weight of a heavy petroleum oil. Preferably this petroleum oil will have a viscosity of about 765 at 100° F.; however, for some applications oils of other viscosities may be used. At any rate, the amount of this raw material in the final product is very small so that the viscosity is closer to the viscosity of the other mixed material.

I mix this graphite dispersion with petroleum oil having a S.U. viscosity of 60 to 75 units at 100 degrees F., which oil is preferably a paraffin base oil or a naphthene base oil or a combination or mixture thereof. In some cases I may add about two ounces of petroleum ether for 50 gallons of such oil to give increased wetting characteristics to the final product. The above oils are known as neutral base oils and specifications limit the acid or foreign matter content to .026%. These raw materials are stored in large storage tanks 10 which may be located outside and from these storage tanks the material is preferably filtered to remove any large foreign matter and pumped into inside storage tanks 11 where the oil is gently stirred or slowly agitated, these inside storage tanks being preferably closed tanks and pressure tight to handle material which can be kept under pressures of from 30 to 120 p.s.i. if desired, and also such tanks may be heated but not in excess of 140 degrees F. Preferably the raw materials are subsequently filtered again and pumped into somewhat smaller size storage tanks 12 in which said raw materials are constantly stirred or otherwise agitated and subjected to a controlled heat to maintain same at 140 degrees F. plus or minus ½ degree.

*Initial blending operation*

The base petroleum oil of whichever type desired and the petroleum graphite dispersion are now blended together in a closed tank 14 and maintained at this temperature of 140 degrees F. plus or minus ½ degree, preferably at a pressure of from 30 to 125 p.s.i. Equal quantities of the base oil and graphite dispersion are mixed together in tank 14 and practically constantly slowly agitated to obtain a thorough uniform mixture.

*Progressive build-up and mixing*

Following this initial blending of the raw materials, said blended mixture is further diluted with quantities of the hot base oil step by step until the final product is obtained. A progressive dilution is had by progressively doubling the mass in a plurality of mixing tanks as hereinafter described in detail. Preferably the plurality of said mixing tanks are set out in multiples of sixteen for practical reasons and for finally obtaining the precise quantities necessary for use in the final mixture.

Specifically, a plurality of sixteen mixing tanks 15 are here described, but it will be readily understood that this number may be varied within reasonable limits and 32 and 64 tanks may be employed. Interposed between tanks 14 and tank 15 is a distributor or manifold 16, pressurized as desired and serving to simultaneously distribute the blended material in equal amounts to all of said tanks 15. A suitable pump and valve 17 is operable to feed the blend to the manifold 16 and separate lines 18 connect the manifold 16 to tanks 15. Valves 19 preferably interlocked for simultaneous operation are operable to meter and control the flow of said blended mixture to tanks 15. At the same time that this blended mixture is introduced into the tanks 15 or just previous or subsequent thereto, hot base oil is fed into each tank 15 from the hot oil storage tank 12, said flow being controlled by valve 20 to the oil manifold 21 and thence by lines or ducts 22 controlled by valves 23 to the individual tanks 15. It is important for the first step in my process to admit equal amounts of the blended mixture and diluting oil to said tanks 15. These tanks are preferably about a two quart size and the amount of such blended mixture which is admitted to each container 15 must be such that the final mixture of oil and colloidal graphite dispersion is not more than one part of the colloidal graphite dispersion to 32 parts of the base oil.

It is very important that the first step commence with a relative small quantity of the blended mixture of colloidal graphite dispersion and base oil, and in most applications I find it preferable to first mix four liquid ounces of the blend with four liquid ounces of the hot base oil. Since the graphite content of the mixture is in the blend only, more or less ounces of such blend used with this first step results in a faster or slower build up of the quantity of progressively diluted mixture. I find that the best results are obtained if the first step is limited to four ounces of each and the addition of hot base oil, which progressively doubles the volume at each step is carried out in four steps as this gives the proper ratio of one to thirty-two between the colloidal graphite dispersion and base oil. More steps result in a decrease in the graphite content of the final product.

Thus, the four ounces of the blended mixture from tank 14 and the four ounces of the base oil from the base oil tank 12 are preferably precisely measured and introduced into each of the tanks 15 at temperatures of at least 139.5 degrees F. and not in excess of 140.5 degrees F. This mixture is then rapidly agitated for a period of at least 15 minutes. Next, eight ounces of the hot base oil is introduced into each of the tanks 15 and again same is agitated for at least 15 minutes. Next, 16 ounces of the hot base oil is metered into each of the tanks 15 and agitated for a period of time of at least 15 minutes. Finally, 32 ounces of said hot base oil is introduced into each of the tanks and same is again agitated for a period of at least 15 minutes, at which time there is now a mixture of 64 ounces of mixture in each of the tanks 15, which mixture comprises one part of colloidal graphite dispersion to 32 parts of the base oil.

The final step in my process consists of discharging all the mixture from all the tanks 15, which, in the specific examples described, has a volume of 8 gallons (½ gallon in each of the tanks 15) into a reservoir or container 25. From this reservoir 25 the mixture, which now may have a temperature of about 120 to 125 degrees F., is discharged into a multi-compartment tank 26 so designed that each compartment 26a holds not in excess of 8 gallons of liquid.

The compartments may be such that they are smaller than an 8 gallon capacity, but they should not be in excess of an 8 gallon capacity, as the best results are obtained by agitating relatively small masses of the mixture. One such tank 26 may comprise a 16 gallon tank with one or more perforated vertical partitions or baffles 27 so as to provide for a rather free surge of the liquid mixture from one compartment to another. Thus, this final step in the process is the mixing of the 8 gallons of mixture as drained from tank 15 through manifold 25 with another 8 gallons of the hot base oil from the base oil tank 12, and this mixture is agitated for a period of time for at least 30 minutes.

This final mixture may be stored in large reservoir tanks, tank cars or other storage facilities and the graphite will remain in perfect suspension therein for from 60 to 90 days without agitation, but for longer storage periods it is desirable to provide for a slow stirring or agitation of same to insure a good uniform distribution of the graphite particles throughout the mass.

This mixture from mixing tank 26 after being thoroughly agitated for 30 minutes is adapted to be mixed with a petroleum oil carrier for commercial use. It may be mixed with fine or heavy petroleum preferably in the proportion of about one part to six of the carrier. Preferably, I mix same with 47.25 to 49.25 gallons of the petroleum carrier, and same is marketed generally in the so-called commercial oil drums of 55 gallon capacity. When so mixed, the graphite is in complete suspension, the petroleum carrier being substantially saturated but not in excess of saturation.

The above process gives a graphite content to the marketable product of about .02514% by weight and for some applications, I may introduce another dilution step and have a graphite content of .0125% by weight.

The release of pressure when discharging the blend from tank 14 or manifold 16 to tanks 15, results in a sudden expansion which is helpful in breaking up the graphite. The time and temperature controls had with this process during the successive agitations causes the original colloidal graphite particles or platelets to progressively break up and as a result, the thickness of the colloidal graphite is reduced from 1½ to 5 microns to about 80 to 100 angstroms in length and not in excess of 200 angstroms. Further agitation in excess of 15 minutes during one or more steps in the process will result in somewhat smaller graphite size, but in most cases the variance in size is negligible and for practical purposes the results obtained with 15 minute periods of agitation are satisfactory. The more time consumed in each operation or step, the more such process will cost, and such increased costs are not warranted by the benefits obtained for most practical purposes.

The progressive doubling of the mass of mixture being treated and the beginning of said progressive steps with a relatively small mass of mixture materials is apparently very essential to give the desired results. The breaking up of the graphite into particle or platelet sizes of 80 to 100 angstroms provides graphite particles which are readily wrapped about and more or less enclosed by molecules of oil. Furthermore these colloidal graphite particles, originally carrying no electrical charge, appear to become electrically charged during the process, and particles having like electrical charges tend to repel each other and thus further the breaking up into smaller and smaller particles, so that the process may be carried further even than described here. The agitation of the mass accelerates this repelling and breaking up activity, and thus the constant motion of these charged graphite particles is such as to promote their breaking up whereby I produce a lubricant carrying graphite in uniform and permanent suspension. No other lubricant has such perfect suspension since as far as I have knowledge, graphite has never been broken up into platelet sizes less than one-tenth or one-twentieth of a micron.

Many applications require the addition of a metal such as silver, molybdenum and/or lithium, so in some applications I find it desirable to add very small quantities of $Ag_2S$, $Li_2S$, and/or $MoS_2$ to the mixture and same is preferably introduced into the mixture in tanks 15 during the initial step of the operation. Therefore, if desired, I may add about .00125% maximum by weight of a metallic sulfide or disulfide of the class consisting of $Ag_2S$, or $Li_2S$, or $MoS_2$. The molecules of metallic sulfide or disulfide appear to be more readily carried and locked to the metal parts to be lubricated by any material, possibly due to the function of the charged graphite particles in being attracted to the part to be lubricated.

As will be readily apparent, the mixture produced in the final operation may be mixed with various types of petroleum oils, of various weights and viscosity depending on the application. Thus this material is capable of being blended with fuels or lubricants, cutting oils, hydraulic fluids and various other ingredients.

The mixtures are agitated by any suitable type of rotating agitators. I prefer a type which will not create a vortex, but which thoroughly stirs and mixes the mass. Rotating agitators having speeds from 1500 to 2500 r.p.m. are satisfactory for respectively giving a slow and rapid agitation.

The resulting relative small sheets or platelets of graphite of a size of from 80 to 100 angstroms or smaller in length are such as to make possible the perfect suspension in a petroleum oil and also make it possible for some to penetrate and lock to metals such as are used for bearings and the like. Therefore with such small size graphite, the practical benefits from the use of this new lubricating agent are vastly improved.

Although I have described but one form of my invention, various modifications and changes may be made therein, without departing from the spirit of the invention or from the scope of the appended claims.

I claim:

1. A process of manufacturing a batch of petroleum graphite composition containing synthetic colloidal graphite in suspension and which is adapted to mixed with about one part to six parts of a hot petroleum oil carrier of a temperature of about 140 degrees F., said process consisting essentially of slowly agitating a blend comprising a mixture of equal parts of preheated petroleum oil material of a S.U. viscosity of about 60 to 75 units at 100 degrees F. and preheated graphite dispersion material consisting of about 90% by weight of a heavy petroleum oil preferably having a viscosity S.U. of about 765 at 100° F. and about 10% solids by weight of synthetic colloidal graphite solids having an initial particle size of about 1½ to 5 microns, said materials being preheated to temperature of about 140 degrees F. plus or minus ½ degree and being maintained at the aforesaid temperature under a pressure of about 30 to 125 p.s.i., next in transferring equal portions of said heated blend mixture into a plurality of containers at atmospheric pressure, and mixing with said blend mixture equal portions of said preheated petroleum oil material and rapidly agitating same for a period of at least 15 minutes and in progressively doubling the volume of mixture by adding additional portions of said preheated petroleum oil material and agitating said mixture between each additive step for at least 15 minutes until such time as there shall be at least 64 liquid ounces of mixture in each container comprising not in excess of one part of the synthetic colloidal graphite dispersion material to 32 parts of the petroleum oil material, there being a sufficient number of containers to supply at least eight gallons of such mixture, transferring equal portions of said mixture from each container to another container and adding eight gallons of said preheated petroleum oil thereto and agitating same therein for at least 30 minutes, the final mixture constituting the batch which is adapted to be mixed with hot petroleum oil carrier in the proportion of 8 parts to 47.25 and not more than 49.25 parts of said carrier.

2. A process of manufacturing a batch of petroleum graphite composition containing synthetic colloidal graphite in suspension and which is adapted to be mixed with about one part to six parts of a hot petroleum oil carrier of a temperature of about 140 degrees F.; said process consisting essentially of slowly agitating a blend comprising a mixture of equal parts of preheated petroleum oil material of a S.U. viscosity of about 60 to 75 units at 100 degrees F. and preheated graphite dispersion material consisting of about 90% by weight of a heavy petroleum oil preferably having a S.U. viscosity of about 765 at 100° F. and about 10% solids by weight of synthetic colloidal graphite solids having an initial particle size of about 1½ to 5 microns, said materials being preheated to temperatures of about 140 degrees F. plus or minus ½ degree and being maintained at the aforesaid temperature under a pressure of about 30 to 125 p.s.i., next in transferring equal portions of said heated blend mixture into a plurality of containers at atmospheric pressure and mixing with said blend mixture equal portions of said preheated petroleum oil material and an amount of metallic sulfur compound of the class consisting of $Ag_2S$, $Li_2S$ and $MoS_2$ by weight being .00125% of the batch being manufactured and rapidly agitating same for a period of at least 15 minutes and in progressively doubling the volume of mixture by adding additional portions of said preheated petroleum oil material and agitating the said mixture between each additive step for at least 15 minutes until such time as there shall be at least 64 liquid ounces of mixture in each container comprising not in excess of one part of the synthetic colloidal graphite dispersion material to 32 parts of the petroleum oil material, there being a sufficient number of containers to supply at least eight gallons of such mixture, transferring equal portions of said mixture from each container to another container and adding eight gallons of said preheated petroleum oil thereto and agitating same therein for at least 30 minutes, the final mixture constituting the batch which is adapted to be mixed with a hot petroleum oil carrier in the proportion of 8 parts to 47.25 and not more than 49.25 parts of said carrier.

3. A process of manufacturing a batch of petroleum graphite composition containing synthetic colloidal graphite in suspension and which is adapted to be mixed with about one part to six parts of a hot petroleum oil carrier of a temperature of about 140 degrees F.; said process consisting essentially of slowly agitating a blend comprising a mixture of equal parts of preheated petroleum oil material of a S.U. viscosity of about 60 to 75 units at 100 degrees F. and preheated graphite dispersion material consisting of about 90% by weight of a heavy petroleum oil preferably having a S.U. viscosity of about 765 at 100° F. and about 10% by weight of synthetic colloidal graphite solids having an initial particle size of about 1½ to 5 microns, said materials being preheated to temperatures of about 140 degrees F. plus or minus ½ degree and being maintained at the aforesaid temperature under a pressure of about 30 to 125 p.s.i., in transferring four liquid ounces of said heated blend mixture into each of a plurality of containers at atmospheric pressure and mixing therewith four liquid ounces of said preheated petroleum oil material and in rapidly agitating same for at least 15 minutes, and in progressively doubling the volume of said mixture by adding additional portions of said preheated petroleum oil material and in agitating the said mixture between each additive step for at least 15 minutes until such time as there shall be at least 64 liquid ounces of mixture in each container comprising not in excess of one part of the synthetic colloidal graphite dispersion material to 32 parts of the petroleum oil material, there being a sufficient number of containers to supply at least eight gallons of such mixture, transferring equal portions of said mixture from each container to another container and in adding eight gallons of said preheated petroleum oil thereto and agitating same therein for at least 30 minutes, said mixture constituting the batch which is adapted to be mixed with hot petroleum oil carrier in the proportion of 8 parts to 47.25 and not more than 49.25 parts of said carrier.

4. A process of manufacturing a batch of petroleum graphite composition containing synthetic colloidal graphite in suspension and which is adapted to be mixed with about one part to six parts of a hot petroleum oil-carrier of a temperature of about 140 degrees F.; said process consisting essentially of slowly agitating a blend comprising a mixture of equal parts of preheated petroleum oil material of a S.U. viscosity of about 60 to 75 units at 100 degrees F. and preheated graphite dispersion material consisting of about 90% by weight of a heavy petroleum oil preferably having a S.U. viscosity of about 765 at 100° F. and about 10% by weight of synthetic colloidal graphite solids having an initial particle size of about 1½ to 5 microns, said materials being preheated to temperatures of about 140 degrees F. plus or minus ½ degree and being maintained at the aforesaid temperature under a pressure of about 30 to 125 p.s.i., next in transferring equal portions of said heated blend mixture into a plurality of containers at atmospheric pressure and mixing therewith equal portions of said preheated petroleum oil material and in rapidly agitating same for a period of at least 15 minutes and in progressively doubling the volume of said mixture by adding additional portions of said preheated petroleum oil material and in agitating the said mixture between each additive step for at least 15 minutes until such time as there shall be at least 64 liquid ounces of mixture in each container comprising not in excess of one part of the synthetic colloidal graphite dispersion material to 32 parts of the petroleum oil material, there being a sufficient number of containers to supply at least eight gallons of such mixture, transferring equal portions from each container to another container having one or more vertically extended perforated baffles dividing said container interior into a plurality of connected compartments, adding 8 gallons of said preheated petroleum oil material to the mixture in the said last container and in agitating the mixture for at least 30 minutes in each of said compartments, said mixture surging back and forth through the perforations in said baffles while being agitated, the final mixture constituting the batch which is adapted to be mixed with a hot petroleum oil carrier in the proportion of 8 parts to 47.25 and not more than 49.25 parts of said carrier.

5. A process of manufacturing a batch of petroleum-graphite composition containing synthetic colloidal graphite in suspension and which is adapted to be mixed with about one part to six parts of a hot petroleum oil carrier of a temperature of about 140 degrees F.; said process consisting essentially of slowly agitating a blend comprising a mixture of equal parts of preheated petroleum oil material of a S.U. viscosity of about 60 to 75 units at 100 degrees F. and preheated graphite dispersion material consisting of about 90% by weight of a heavy petroleum oil preferably having a S.U. viscosity of about 765 at 100° F. and about 10% by weight of synthetic colloidal graphite solids having an initial particle size of about 1½ to 5 microns, said materials being preheated to temperatures of about 140 degrees F. plus or minus ½ degree and being maintained at the aforesaid temperature under a pressure of about 30 to 125 p.s.i., next in transferring equal portions of said heated blend mixture into a plurality of containers at atmospheric pressure and mixing therewith equal portions of said preheated petroleum oil material and in rapidly agitating same for a period of at least 15 minutes and in progressively doubling the volume of said mixture by adding additional portions of said preheated petroleum oil material and in agitating the said mixture between each additive step for at least 15 minutes until such time as there shall be at least 64 liquid ounces of mixture in each container comprising not in excess of one part of the the synthetic colloidal graphite dispersion material to 32 parts of the petroleum oil material, there being a sufficient number of containers to supply at least eight gallons of such mixture transferring equal portions of said mixture from each container to another container and in adding eight gallons of said preheated petroleum oil thereto and agitating same therein for at least 30 minutes, the final mixture constituting the batch which is adapted to be mixed with a hot petroleum oil carrier in the propotrion of 8 parts to 47.25 and not more than 49.25 parts of said carrier.

References Cited in the file of this patent

UNITED STATES PATENTS

| | | |
|---|---|---|
| 1,879,874 | Kidder | Sept. 27, 1932 |
| 2,045,501 | Mandel Sloh | June 23, 1936 |
| 2,176,879 | Bartell | Oct. 24, 1939 |

OTHER REFERENCES

Bastian: "Metal Working Lubricants," McGraw-Hill Book Co. (1951), pp. 16–17.

"'Dag' Dispersions for Industry," Acheson Colloids Co. Catalog No. 460, Port Huron, Mich., 1954, 8 pages.